Aug. 29, 1933.                J. W. LEIGHTON                 1,924,448
                          THREADED SPRING SHACKLE
                            Filed Dec. 21, 1931

Inventor.
John Wycliffe Leighton
by
atty.

Patented Aug. 29, 1933

1,924,448

UNITED STATES PATENT OFFICE 1,924,448

THREADED SPRING SHACKLE

John Wycliffe Leighton, Port Huron, Mich.

Application December 21, 1931
Serial No. 582,321

3 Claims. (Cl. 267-54)

The principal objects of this invention are to facilitate the assembling of the shackles upon the springs and the motor car frame and ensuring the secure locking of the shackle to the frame and spring in such a manner that they may however be readily disconnected for repair or replacement.

The principal feature of the invention consists in providing a bushing having an internal threaded bearing surface to engage a threaded shackle with an external thread of the same pitch as the bearing thread but presenting angled surfaces of a low flat angle adapted to engage correspondingly threaded surfaces in the spring end or frame bracket whereby an implied longitudinal stress will effect a clutching engagement of one of the continuous spiral surfaces of the external thread of the bushing with one of the continual spiral surfaces of the thread in the spring end or frame bracket.

Figure 1:
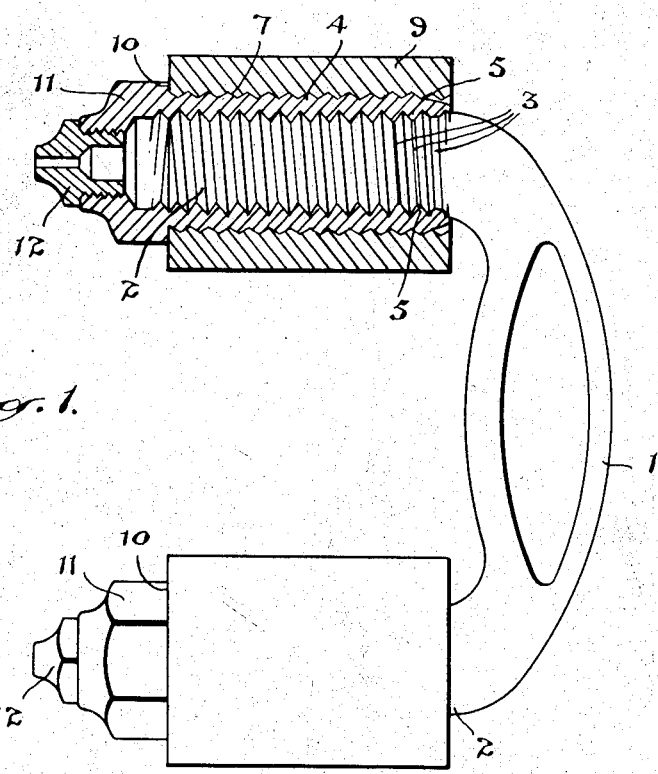

In the accompanying drawing, Figure 1 is an elevational view of a U type of shackle showing it attached to a frame end and to a spring eye with my improved locking bushing, the frame bracket and bushing being shown in longitudinal section.

Figure 2:
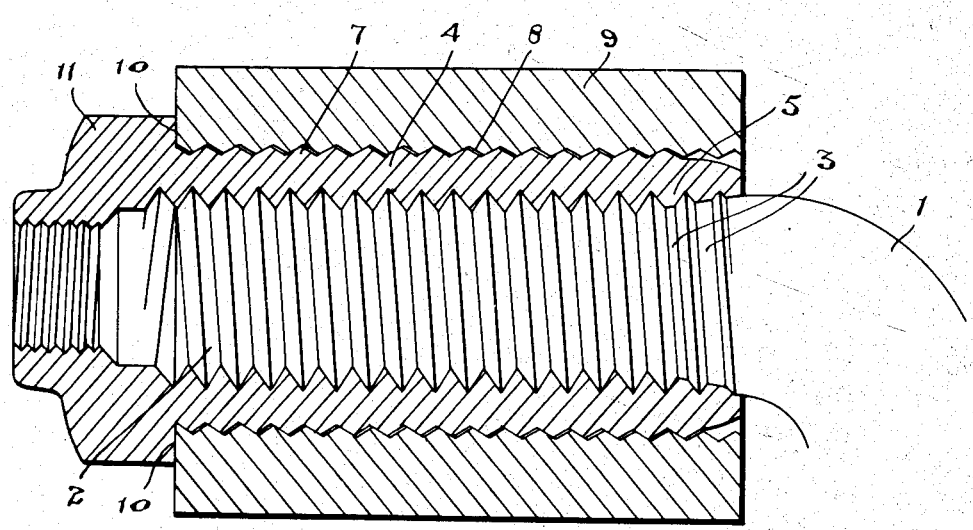

Figure 2 is an enlarged sectional view of the bushing and frame bracket showing the manner of locking the bushing in place.

It has been thoroughly established that threaded bearing surfaces for spring shackles are highly desirable and in a previous patent application I have shown a single piece type of shackle formed in U shape with two threaded extensions adapted to extend into the frame bracket and spring eye respectively.

I have also illustrated in a previous application the use of an internally threaded bushing to receive such a shackle having an external thread to be threaded into the frame bracket or spring eye.

The present invention has been devised to form an important improvement over the previous proposals.

In the construction herein shown the shackle 1 which is formed of a unitary piece of metal having the parallelly arranged arms 2 is threaded with any desired type or pitch of thread and it is important that in order that the shackle may maintain its maximum strength that the root of the thread cut into the arms 2 shall clear outwardly at the base of the arms where they join the main body of the shackle.

The flaring root surfaces 3 are arranged a sufficient distance from the main body 1 of the shackle to support said shackle clear of the frame bracket and spring eye.

The bushings 4 are threaded internally to fit upon the threaded arms 2 of the shackle with the desired amount of tolerance to permit the shackle to swing freely, the thread at the inward end 5 having the tops thereof removed to clear the flaring root surfaces of the shackle.

The outer periphery of the bushing 4 is formed with a threaded surface 7 which is of the same pitch as the internal thread but the depth of the cut is comparatively light so that the spiral surfaces of the thread are arranged in obtuse angular relation and the angle is such that a slight end thrust will cause a jamming or clutching action to occur between one of the spiral surfaces of the bushing thread and the corresponding contacting surface 8 of the threaded interior of the frame bracket eye 9.

The shallow nature of the thread cut in the frame bracket for the bushing enables the operation of threading to be performed in as simple a manner and at no greater expense than the hole can be reamed for a smooth bushing. Therefore no extra expense is added to the operation of preparing the spring and frame bracket to receive the bushing. The operation of threading the exterior of the bushing is extremely simple and is of an inexpensive nature.

The external thread of the bushing is cut to fit the internal thread of the frame bracket or spring eye with an easy tolerance so that it will thread in quite freely and when placed in its utimate position with the flange surface 10 of the nut head 11 engaging the end of the frame bracket or spring eye, the end thrust applied causes the low angled taper surfaces 8 to engage.

As pressure is applied by further rotation of the bushing, the other surface of the bushing thread draws away from the corresponding surface of the frame bracket and spring eye when the contacting surfaces bind in a very secure clutching engagement throughout the entire length of the thread.

It will be readily appreciated that such a clutching grip of these external threaded surfaces of the bushing will hold the bushing in place without fear of its ever becoming accidentally loosened, but in the event of it being required to separate or remove a shackle, the bushing may be unscrewed.

The bushing is closed at its outer end by means of a suitable lubricating connection 12 to enable a lubricant to be forced into the pocket formed in the interior of the end of the bushing which may be carried to the threads of the bearing surfaces through suitable ducts.

In assembling this shackle, one of the threaded shackle arms is inserted into the frame bracket and the open end of the bushing is inserted over the end of the threaded shackle arm and at the same time is inserted into the bracket eye. A turn or two with the fingers causes both threads to catch and the bushing may be driven home in a very rapid manner by the use of a power drill, either electrically or pneumatically operated, or a spiral driver might be used. The simple act of driving the bushing home draws its external tapered threads into locking contact with the thread in the bracket and it is automatically locked in place.

The assembling of the shackle on the spring may be a bench job and the spring may be carried to the assembly line with the shackle thus attached. It is then merely necessary to place the spring in position, inserting the free end of the shackle into the frame bracket and to insert the bushing in a manner similar to that described.

It will be readily seen that the assembler is required to handle only the one part in addition to the spring to which the shackle is attached, such part being the threaded bushing.

No adjustment is required in fitting a shackle of this kind. Once it is put together it holds its position indefinitely.

It will be understood from this description that not only is such a shackle and bushing extremely economical from the point of cost but it is very strong and free riding and presents an excellent appearance. There are no parts to come loose and the threaded bearing surfaces will not squeak or rattle.

What I claim as my invention is:

1. The combination with parts connected by a shackle each part having a threaded orifice, of a shackle member having an external threaded bearing surface, and a bushing having a threaded internal bearing surface to fit said shackle and an external threaded surface adapted to thread into the threaded orifice, the orifice threads and the co-operating external threads of the bushing presenting a wide obtuse angular arrangement of thread surfaces whereby upon the application of longitudinal stress on the bushing said respective thread surfaces engage in a clutching locking contact.

2. The combination with parts connected by a shackle each part having an orifice, of an extremely shallow thread formed in the orifices of said parts having a low flat obtuse angle, a shackle having a bearing thread fitting loosely in said orifice, and a bushing fitting in each of said orifices and having a low flat obtusely angled external thread to co-operate with the thread of the orifice and having a flange adapted to engage the respective part and apply longitudinal stress to draw one of the spiral surfaces of the bushing thread into clutching contact with one of the spiral surfaces of the orifice in which said bushing is arranged.

3. A bearing bushing having a threaded inner bearing surface, and an external surface formed with a flat obtuse angled thread extending to a shoulder at one end.

JOHN WYCLIFFE LEIGHTON.